United States Patent [19]

Goldstein

[11] Patent Number: 5,053,910

[45] Date of Patent: Oct. 1, 1991

[54] SURGE SUPPRESSOR FOR COAXIAL TRANSMISSION LINE

[75] Inventor: Richard Goldstein, Northbrook, Ill.

[73] Assignee: Perma Power Electronics, Inc., Chicago, Ill.

[21] Appl. No.: 421,802

[22] Filed: Oct. 16, 1989

[51] Int. Cl.$^5$ .............................................. H02H 1/00
[52] U.S. Cl. .................................... 361/111; 361/113; 333/206
[58] Field of Search ............... 361/111, 113, 117, 118, 361/119, 126; 333/81 A, 12, 260, 206, 202

[56] References Cited

U.S. PATENT DOCUMENTS

| | | | |
|---|---|---|---|
| 3,602,848 | 8/1971 | Leonard | 333/206 |
| 3,747,030 | 7/1977 | Walding | 333/206 |
| 4,202,594 | 5/1980 | Coleman et al. | 333/206 |
| 4,807,083 | 2/1989 | Austin | 361/111 |
| 4,810,980 | 3/1989 | Heston et al. | 333/814 |

Primary Examiner—Todd E. Deboer
Attorney, Agent, or Firm—Wallenstein, Wagner & Hattis, Ltd.

[57] ABSTRACT

A surge protection circuit for insertion into a coaxial cable system is configured as a coaxial structure of given characteristic impedance extending between matching input and output connection. A surge suppression network is built into the coaxial housing, and includes a shunt inductor shunting the center conductor at an intermediate point to the housing. A capacity is series-inserted into the output section of the center conductor beyond the inductor. The capacitor is a plate-shaped element metalized on both faces and edge-inserted into the confronting line sections of the center conductor and soldered thereto, so that capacitor lead inductance is incorporated into the center conductor. At the passband frequency of cable television communications the reactance of the inductor is high compared to the characteristic impedance, and similarly the reactnace of the capacitor is low, resulting in negligible insertion loss to the system. At the uppermost harmonic component frequency of line surges the low inductive reactance, and the high capactivie reactance cause strong attenuation of surge signals. A pair of diodes connected between the output sections of the center conductor of the coaxial line and the coaxial housing or outer conductor provides additional surge attenuation.

24 Claims, 3 Drawing Sheets

U.S. Patent    Oct. 1, 1991    Sheet 1 of 3    5,053,910
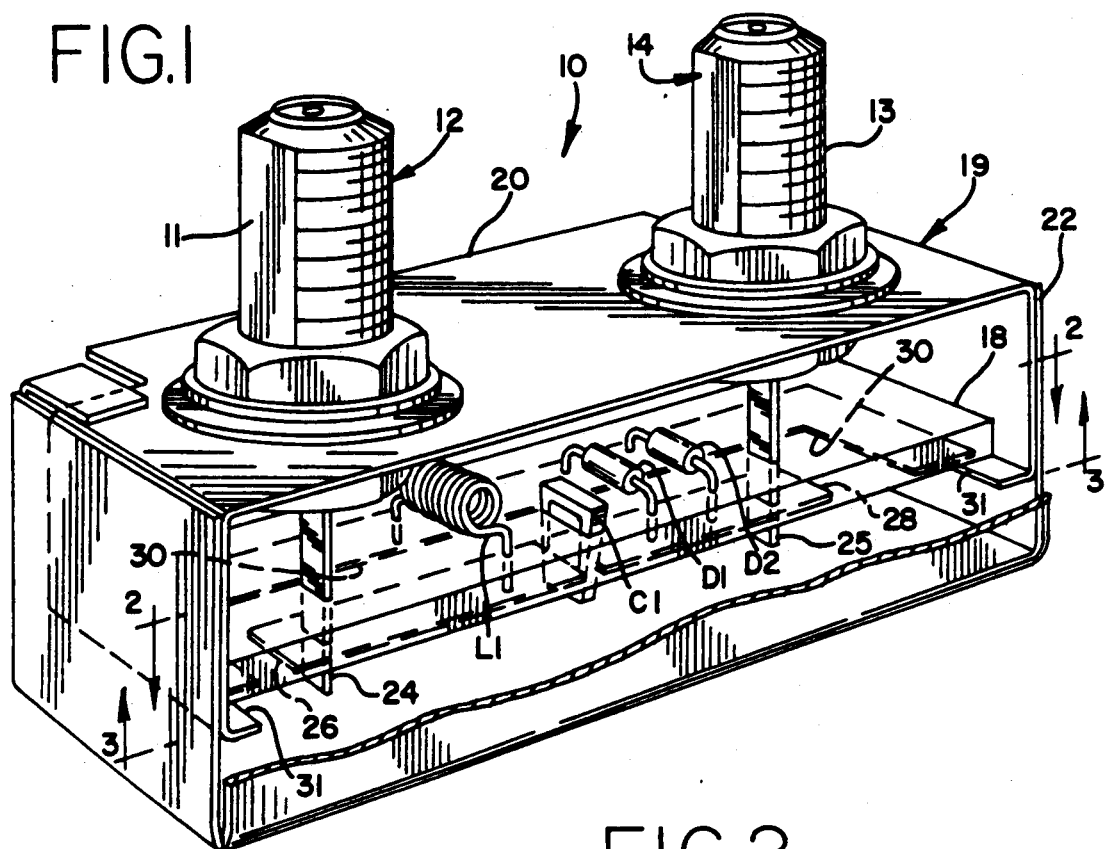
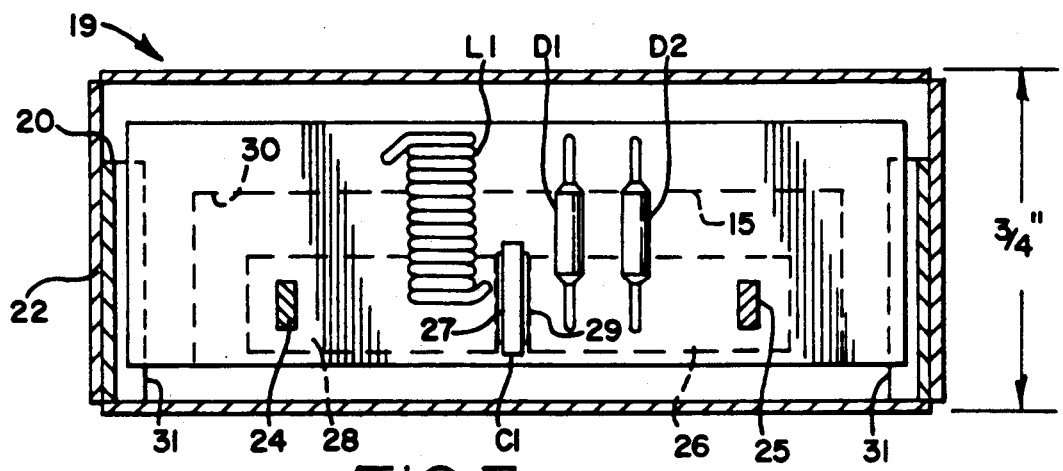
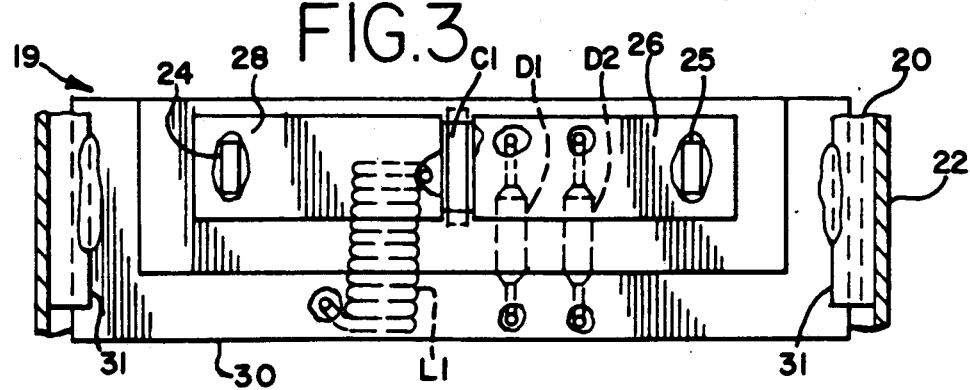

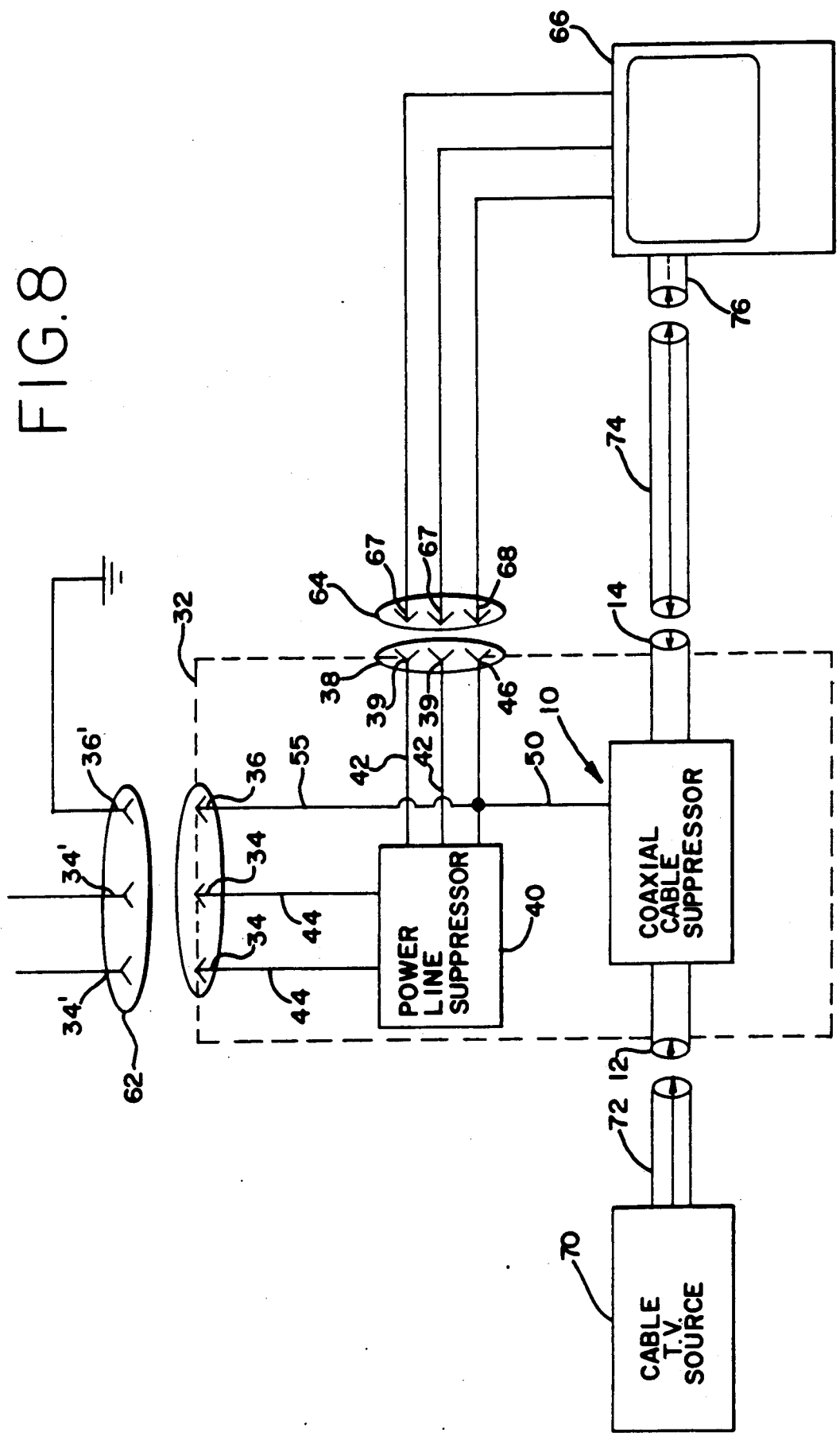

SURGE SUPPRESSOR FOR COAXIAL TRANSMISSION LINE

DESCRIPTION

TECHNICAL FIELD

The field of the invention is surge protection devices for protecting electrical appliances from power line and coaxial line voltage surges caused by lightning strikes.

BACKGROUND OF THE INVENTION

This invention pertains to means for providing protection from transient voltage surges induced in coaxial cables and the like which carry television signals from antenna systems or cable television distribution services. Although television antennas are usually provided with lightning arresters or antenna discharge devices, and cable systems have protection devices for the distribution amplifiers, there is insufficient protection for the television receivers and/or cable-converters at the indoor site where such equipment is typically located. Reports from high lightning areas have indicated that more than fifty percent of the households served by a single cable-television service have experienced significant equipment damage during a particularly severe electrical storm.

The problem of protecting home television equipment from transient voltage surges caused by lightning is compounded because such surges can enter the equipment through either its connection to the household power distribution system or through the coaxial cable system supplying the television connections simultaneously. Television equipment is most commonly connected to the household power line by means of a "two-wire" line cord. The "neutral" or low-potential wire is grounded to earth by a connection made at the electrical utility service entrance to the building. This wire is commonly referred to as the "grounded" conductor. Some television equipment such as video cassette recorders (VCRs) and cable-converters employ three-wire line cords which connect exposed metallic enclosures to an additional third terminal frequently provided at the wall outlet receptacle. This third or ground terminal is connected to what is commonly referred to as a "grounding" conductor. This grounding conductor is a separate wire and/or metallic conduit that is also connected to earth at the building electrical utility service entrance.

The coaxial cable may enter the premises from either overhead or underground. The outer conductor or shield of the cable is grounded to earth at some outdoor location, such as at the utility pole or underground terminal from which a cable television feeder branch is connected to serve the premises, or at an antenna discharge device (lightning arrester) connected to an outdoor earth grounding rod. In spite of these ground connections, nearby lightning strokes can induce large transient voltages in the coaxial cable, whether it is overhead or underground. Such voltage surges will appear at the input to the television equipment to which it connected.

This surge voltage will "seek earth" through the television equipment. If there is insufficient threshold breakdown voltage between the cable input of the television equipment and the neutral or grounding conductor of the power cord there will occur an arc-over, and destructive currents may flow through the equipment to the earth connection at the utility service entrance of the building.

In a similar manner, transient voltage surges induced in the power distribution system will propagate throughout the premises and may appear at every electrical outlet. These voltages will also "seek earth", and may cause destructive currents to flow through the television equipment and the coaxial cable to its remote earth connection.

The possible flow of destructive currents from lightning-induced transient voltage from two sources to the television equipment explains why using only a power line surge protector by itself or only a coaxial cable surge protector by itself has often failed to provide the needed protection.

Proceeding according to the above description of the transient voltage surge environment involving coaxial cable connected television equipment, it is known in the art that adequate protection can best be provided by combining the coaxial cable protector with the power line protector in a single protection unit. Such protection units are typically in the form of a wall-mountable housing having a male three-pin wall plug rigidly affixed to the back surface thereof for insertion into a three-conductor power outlet receptacle on the wall. Two of these plug pins provide power from electric power lines, and the third pin is thereby connected to the "grounding" conductor of the power outlet receptacle which leads to the power system local ground. The power line protector is incorporated into the protection unit and is connected to transfer power from the power input pins of the protection unit plug to the corresponding pins of an appliance socket mounted on the housing. The power line surge suppressor is grounded to the grounding pin of the protection unit plug. The coaxial cable protector is provided within the protection unit, having input and output connectors extending therefrom. The coaxial cable bringing in cable television signals is connected to the input of the coaxial cable protector, and a length of coaxial cable is connected between the cable protector output and the television equipment signal input terminal. The coaxial cable protector has a ground lead which connects the outer connectors of the coaxial cable protector to the grounding pin of the power input plug, and a ground connection is similarly provided between one or more appropriate elements of the coaxial cable surge protector and the above-mentioned grounding pin. All necessary grounds are thus returned to a common point over very short leads.

The performance requirements for television coaxial cable surge suppressors are severe. Television cable system operators often supply service to a large geographical area serving thousands of subscribers. They must assure an adequate signal level at the subscriber's site to guarantee good picture quality. Because of the losses inherent in the coaxial cables used to distribute the signals, distribution amplifiers are employed at various locations throughout the system to restore the signals to adequate levels. Line taps to individual premises also introduce losses, as do lengthy cable runs from utility poles or underground terminals to the subscriber's television equipment location in the residence. The economics of the distribution system usually dictate that as small a margin as is practicable to assure good picture quality be provided in the level of signal at the subscriber's site. Often this margin may be so small as to permit no significant further attenuation of the signal by the coaxial cable surge suppressor. Some cable operators demand that the suppressor introduce no more than one decibel of insertion loss over the entire frequency range. One-half decibel, or less, insertion loss would be preferred if achievable.

In addition to the low attenuation or insertion loss requirement of a coaxial cable surge suppressor, it should be capable of suppressing the transient voltages to very low levels. Transient voltage surges on coaxial television cables can reach magnitudes of the order of three thousand volts before there is arc-over in the cable or in the cable connector plugs and receptacles used in the system. To protect sensitive tuner input circuits and microprocessors employed in modern television receiving equipment, the surge should be suppressed to the order of several volts.

The prior art has recognized this need to provide means for suppressing surges at the coaxial cable input to household television equipment. Some of the prior art devices are not combined with power line surge suppressors, although they do provide a low impedance connection to the grounding conductor at an electrical outlet receptacle. Other prior art devices do combine coaxial cable surge suppression with power line surge suppression. However, all such prior art devices have been found to have one or more of the following deficiencies in the performance or construction of the coaxial cable surge suppressor:

1. The coaxial cable suppressor is not combined with a power line surge suppressor, or if it is, it may not share a common low impedance connection to the grounding conductor of the power line receptacle.

2. The coaxial cable suppressor employs surge suppression components which are more applicable to power lines or communication lines such as metal-oxide-varistors (MOV's) or silicon avalanche diodes. Such devices have fairly high capacitance and present a low reactance at the high frequencies of the television signals. This causes unacceptable attenuation of the television signal.

3. Some prior art devices employ only a single gas discharge device shunted across the coaxial cable from center conductor to the outer conductor (shield) of the cable. While such devices may be of sufficiently low reactance to avoid excessive signal attenuation, their slow response to rapidly rising transient voltages may result in a let-through voltage of hundreds of volts prior to the device striking and suppressing the surge. Also, low level transients may not cause the device to strike, thus permitting transient voltages of several hundred volts to be passed through to the television equipment. This voltage may be high enough to damage sensitive input circuits or other components in the equipment.

The present invention provides a solution of these problems.

SUMMARY OF THE INVENTION

According to a feature of the invention, a surge suppressor is preferably configured as a coaxial transmission line comprising a center conductor axially disposed within a conducting housing, the relative geometries of the central conductor and the housing dimensions being chosen so that the resulting structure has a given characteristic impedance, e.g. 75 ohms. The central conductor is affixed at each end to matching 75 ohm coaxial connectors, one serving as the input connector and the other serving as the output connector. A shunt impedance, preferably an inductor, is preferably connected between an intermediate point on the central conductor and the filter housing. The inductance value is chosen so that its impedance in the line surge frequency spectrum is much lower than the characteristic impedance value, thereby causing a significant attenuation of power line surge Fourier frequency components, and, because of the wide separation of the power line surge frequency spectrum and the cable television system communication passband spectrum, the impedance element has an impedance much higher than the characteristic impedance, so that cable system signals pass without substantial attenuation.

The center conductor is preferably broken on the load side of the point where the central conductor joins the shunt inductor, and a series impedance, preferably a capacitor, is connected to bridge the resulting gap. The capacitor is preferably of the "leadless" type consisting of a ceramic plate having metalizations on the major flat surfaces and is inserted into the gap in the center conductor and standing transversely to the axis thereof. The metalizations are thereafter soldered to the confronting ends of the center conductor. By this means a "leadless" capacitor is inserted into the center conductor so that essentially all lead inductance associated with the capacitor is that of the center conductor itself, which is already configured as part of a 75 ohm line.

The shunt inductor and series capacitor thus form an L-filter, the capacitance value being chosen so that the capacitance reactance thereof in the surge frequency spectrum is substantially higher than the line characteristic impedance (the 75 ohm exemplary value), but drops to a reactance value at the low end of the communication passband (50 megahertz) substantially lower than 75 ohms. Thus, only a small additional attenuation is introduced into the filter.

A second surge suppression network formed as a pair of diodes connected with opposite polarities are preferably connected between the load side of the center conductor and ground. They are selected so that their shunt capacitance at zero reverse voltage is so low as to make their capacitive reactance in the communication passband very high with respect to the exemplary characteristic impedance. The value of the series capacitor is further preferably subject to the design constraint in that it must not store energy under, for example, a 3000 volt surge wave having a rise time of 5000 volts per microsecond sufficient to exceed the safe operating limits of the diodes.

In a preferred form of the invention, the filter is designed to be emplaced within a plug-in wall-mountable outlet box with its power outlet connectors accessible through an outwardly facing wall thereof, the filter having a large grounding strap connecting the filter housing or case to the male grounding pin of the power plug, so that when the box is plugged into a three-wire power socket, the filter housing is tied to ground. In a preferred form of the invention, a power line surge suppressor is also contained within the outlet box, similarity having its ground returned to the same grounding pin.

Other features and advantages of the invention will be apparent from the following specification taken in conjunction with the following drawings.

BRIEF DESCRIPTION OF DRAWINGS

FIG. 1 is a partially cutaway perspective view of a transmission line surge suppressor.

FIGS. 2 and 3 are plan and bottom views of the configuration of elements of the surge suppressor shown in FIG. 1 taken along cut lines of 2—2 and 3—3 respectively.

FIG. 8 is a block schematic diagram showing the interconnection of the outlet box of FIG. 7 with associated elements of a cable television system.

DESCRIPTION OF THE EXEMPLARY FORM OF THE INVENTION

Figure 4:
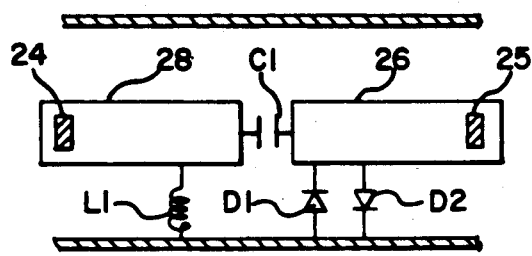
FIG. 4 is a partially schematic view of the surge suppressor of FIGS. 1, 2, and 3.

The present invention combines filter and surge suppressor technology in a unique way. Conventional wisdom with regard to transient voltage surge suppression technology teaches that surges cannot be suppressed by the use of filters alone. While this is true in a practical sense, in most instances, it is not necessarily true from a theoretical standpoint. While it is theoretically correct that a lossless low-pass filter, such as is commonly used to reduce noise on power lines, cannot reduce the energy of a transient voltage surge, it is possible to specify such a filter that would redistribute the energy in the time domain in such a manner that the maximum voltage would be reduced to a safe level, although it would persist for a considerably longer time duration. In the power line environment, however, it is equally true that it is not possible to design a practical low-pass filter that would pass the 50 or 60 cycle AC power without loss, and also be able to sufficiently attenuate the higher frequency transient voltages to a safe level. This limitation arises from the size and cost of the series inductors and shunt capacitors required for such a low-pass filter design.

This practicability of a filter to suppress transient voltage surges is influenced, in part, by the difference between the frequency of the pass-band of the filter and the frequency components of the surge voltage that is to be suppressed. In the power line environment, these frequency separations are not extremely great. Thus, with the requirement for series inductors that must be very large in value and carry large currents without core saturation or significant power loss, and shunt capacitors that must also be large in value and have AC ratings for "across-the-line" application, it is not possible to produce an effective filter for suppressing power line transient voltage surges within the usual limitations of size and cost for this application.

In the communications environment, however, conditions can be more favorable for the application of filter technology to the design of transient voltage surge suppressors. In the case of television coaxial cable systems, for instance, the frequency separation between the lowest television frequency and the highest significant frequency component of a transient voltage surge is at least an order of magnitude greater than the separation of their counterparts in the power line environment. This suggests that the application of high-pass filtering for television coaxial cable surge suppression could be useful, and it is, in fact, a part of the technology employed in this invention.

A study of representative of power line voltage surges induced by nearby lightning strikes indicates that they are reasonably well approximated by an initial rapidly rising voltage waveform requiring approximately eight microseconds to go from 10% to 90% of the peak value, followed thereafter by a relatively slow decay dropping to approximately 50% of the peak value 10 to 15 microseconds after the peak is reached. The leading edge of the waveform sets the upper boundary of the principal energy in the fourier spectrum of the transient pulse, and this boundary may roughly be approximated as lying at approximately 100-300 kilocycles. The frequency spectrum of television signals distributed by cable, on the other hand, runs from 50 megahertz to approximately 1000 megahertz.

Referring now to the drawings the surge suppressor of the preferred form of the invention basically consists of a special section of 75 ohm coaxial transmission line into which have been inserted certain shunt and series filter-forming components. These components are designed so that at the frequencies of the signals to be conducted through this special section of transmission line they will have a minimal effect on the signal; that is, the shunt impedance of the components is very high and the series impedance is very low compared to the 75 ohm line impedance. However, at the frequency components of the surge voltage these components act as a high pass filter and surge suppression elements.

The surge suppressor assembly 10 shown in FIGS. 1, 2 and 3, is designed as a special transmission line section to be inserted into a 75 ohm coaxial cable system of the type commonly used to carry television signals from an antenna or cable service terminal to a television receiver in a home. Coaxial connectors 12 and 14 have a characteristic impedance of 75 ohms and are compatible with those normally used with 75 ohm coaxial lines bringing cable transmissions to television receivers. The center conductor 24 and shell 11 of the connector 12 form the input terminals of the surge suppressor 10 and the center conductor 25 and shell 13 of the connector 14 form the output terminals thereof.

A center conductor (first conducting means) for the special section consists of axially extending coplanar conducting strips 26,28 formed on an epoxy-fiberglass printed circuit board 18 and connected at their outer ends to the center conductors 24,25 of the connectors 12,14, passing at right angles through apertures in the board 18 and the strips 26,28. A gap 16 is provided between the confronting inner strip ends. The outer conductor (second conducting means) of the special section is a sheet metal enclosure 19 having upper and lower interleaving halves 20,22. The upper half 20 carries the coaxial connectors 12,14. The width of the strips 24,26 and the dimensions by which they are spaced to the enclosure are selected so as to preserve, as closely as, possible a 75 ohm transmission line characteristic impedance. This is verified by measuring the insertion loss of a special prototype unit having no gap 16 (and none of the additional components shown) when connected between a 75 ohm signal generator and a 75 ohm calibrated receiver. Over the frequency range of 50 mHz to 900 mHz it was found that this insertion loss of the prototype could be maintained at less than 0.2 dB.

FIG. 4 is a functional diagram of the special transmission line section showing added surge suppression components. These components are high-pass filter elements inductor L1 and capacitor C1, and suppression diodes D1,D2. The capacitor C1 (series impedance means) is inserted through the gap 16 passing through the circuit board between the confronting outer ends of the input and output strips 25,28.

Figure 5:
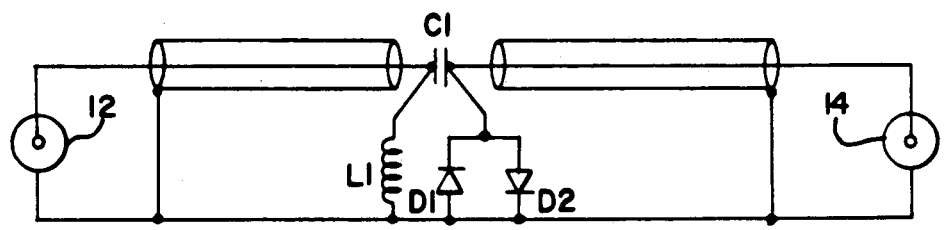
FIG. 5 is a schematic equivalent circuit of the surge suppressor of FIGS. 1, 2 or 3.

FIG. 5 is a schematic equivalent circuit of the suppressor assembly 10. FIGS. 2 and 3 are a plan views of the printed circuit board 18 with the components mounted thereon.

Figure 6:
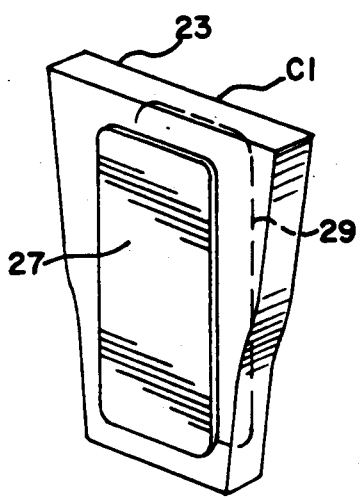
FIG. 6 is a perspective view of a leadless capacitor used in the surge suppressor of FIGS. 1, 2, or 3.

Capacitor C1 is a special "leadless" type one kilovolt capacitor as shown in FIG. 6, consisting of a trapezoidal shaped ceramic body 23 which has solder-plated metalizations 27,29 on each major flat surface. This permits it to be solder-bonded to the transmission line copper plated strips 26,28 with the strips itself acting as leads of the capacitor. Thus, any inductance normally associated with ceramic capacitor leads is substantially eliminated. The capacitor value is chosen so that its reactance at the lowest frequency of the pass band is negligible compared to 75 ohms. Being leadless, it maintains a very low reactance since its self resonant frequency is above the highest frequency of the passband. There is one other criterion for selecting the capacitor value: it must not store enough energy so that if the maximum stored energy that occurs during a surge is deposited into one of the following suppression diodes D1 or D2 the diode will not be destroyed. In this instance a leadless capacitor of 500 pF to 1000 pF (picofarads) have been found to be satisfactory. For a nominal value of 750 pf, the capacitive reactance presented by capacitor C1 at 300 kilohertz is 700 ohms, i.e. nearly 10 times the characteristic impedance of 75 ohms. At the communication passband frequency lower edge of 50 megahertz the capacitive reactance is approximately 6 ohms, i.e. at least a factor of 10 less than the characteristic impedance.

The inductor L1 (first shunt impedance means) is connected at one end to a ground strip 30 connected to the interior of the upper housing half 20 and at its other end to the input strip 26 at a point preferably close to the capacitor C1 at the input side thereof. The ground strip 30 is provided in the form of a peripheral V-shaped copper conductor formed on the lower surface of the printed circuit board 18. The printed circuit board 18 is supported within the housing 19 by means of inwardly extending shelves 31 to which the ends of the ground rail 30 are soldered.

The inductance value of inductor L1 is chosen so that its reactance at the lowest frequency of the pass band is very high compared to 75 ohms, in this instance requiring a value of the order 1 microhenry. At the presumed upper surge frequency component limit of 300 kilohertz the reactance presented by inductor L1 is approximately 2 ohms, a value of approximately one-fortieth of the characteristic impedance, clearly causing severe attenuation. At 50 megahertz the inductive reactance of this element is about 320 ohms, i.e. a little more than four times the characteristic impedance. This increases the transmission loss from the normal 6dB. for a matched transmission line to 6.2dB, which is an insertion loss of 0.2dB.

The remaining suppression components, diodes D1 and D2, are connected with opposite polarities between the load side of the center conductor strip 28 and the ground rail 30, preferably being connected close to the capacitor C1. They will conduct, in their forward conduction direction, any residual voltage passed by the high pass filter components L1,C1. These diodes D1,D2 (second shunt impedance means) are selected so that their shunt capacitance at zero reverse voltage is so low as to make their capacitative reactance at the highest passband frequency significantly larger than 75 ohms; in this case less than 1 picofarad, i.e. about 500 ohms at 900 megahertz. Diodes D1,D2 in the present embodiment are low capacitance silicon diodes having type number 1N4454.

With respect to relative dimensions, the layouts shown in FIGS. 1, 2 and 3 are reasonably close to actual scale. The housing 19 is ¾ inches wide as indicated by the scale in FIG. 2, has a length of 1¼ inches, and a height of 7/16 inches. The shelves 21, and hence the conducting strips 28,26,30, are disposed ¼ inch below the top of the housing 19. The center conductors 24,25 of the coaxial connectors 12,14 are 1 inch apart. The center element strips 2,28 are 3/16 inches wide and are centered at a standoff distance of 5/32 inches between the confronting housing wall 17 and the major interior edge 15 of the grounding strip 30. The grounding strip 30 has a width of 5/32 inches, and the printed circuit board has a width of ½ inch.

The performance of the surge suppressor described above was tested with a 3000 volt surge wave having a rise time of 5000 volts per microsecond when the generator is unloaded. If the generator is short circuited the current wave associated with this surge has a rise time of 8 microseconds and a decay time to half of the crest value of 20 microseconds. The crest value of this current wave is 3000 amperes. This test wave was selected because the wave shape has been found to be appropriate for surges induced by lightning in buried cables as well as in wires above ground. The value of 3000 volts was selected because the coaxial cables and connectors have rated dielectric withstand voltages of about this magnitude.

When tested with the surge wave described above it was found that the let-through or suppressed voltage level was of the order of several volts, being largely determined by the forward conduction characteristics of the suppression diodes D1-D2. There was no damage to the suppressor with repeated exposure to this surge. The 75 ohm insertion loss of the suppressor was found to be less than 0.5 dB from 50 to 900 megahertz.

All of this is achieved with a minimum of components. Conductor L1 (first shunt impedance means) causes a strong attenuation of input surges, in particular reducing their value to a voltage well below the breakdown value of capacitor C1, but present negligible shunting action at the communication passband. Significant additional attenuation is introduced by the relatively high impedance of capacitor C1 (series impedance means) in the region of the surge frequency components, this element having relatively little effect at the communication passband. Finally, the diodes D1,D2 (second shunt impedance means) finally limit the output line surges to less than a few volts.

Figure 7:
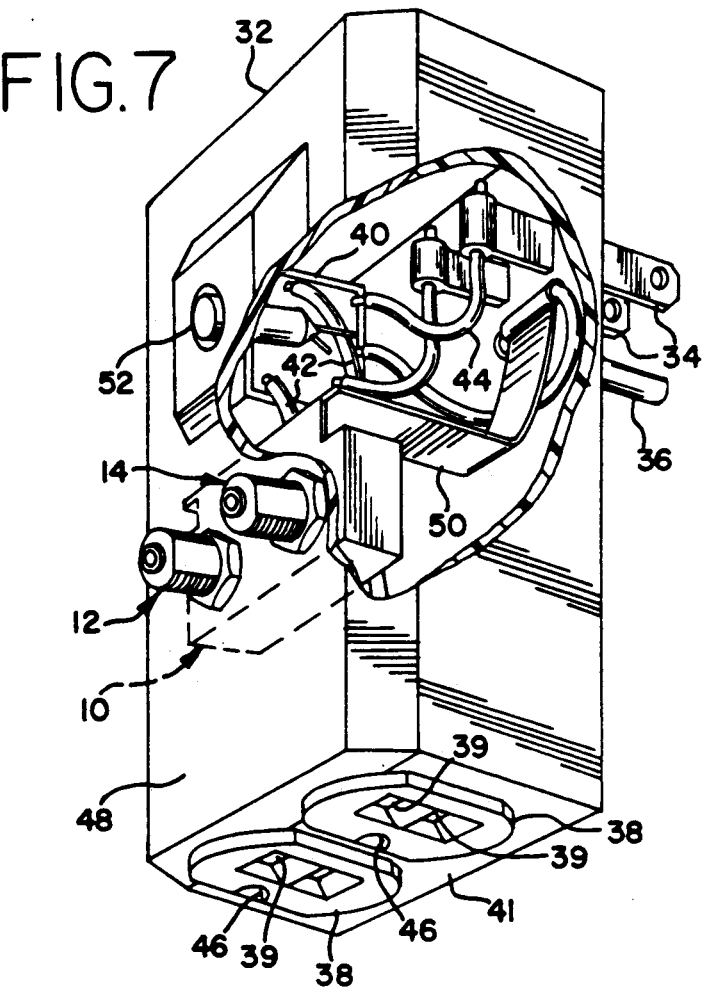
FIG. 7 is a partially cutaway perspective view the surge suppressor shown in FIG. 1 installed in a plug-in type outlet box.

FIG. 7 shows a surge suppressor assembly 10 incorporated into a wall-mountable outlet box 32 having rearwardly extending power pins 34—34 and an associated rearwardly extending ground pin 36, all pins being configured for insertion into a wall outlet. Power and grounding from the pins 34—34,36 are fed to a pair of female appliance plugs 38—38 mounted on the lower face 41 of the housing 32. A power line surge suppressor 40, which may take any one of a variety of forms such as that disclosed in U.S. Pat. No. 4,587,588, is connected by power leads 44—44 to the male pins 34—34 and passes surge-suppressed power to the corresponding terminals 39—39 of the female plugs 38—38 through power feed wires 42—42. A ground return lead 55 of the power line surge suppressor 40 is returned to ground pin 36 of the male plug, as are the ground terminals 46—46 of the female plugs 39—39. The suppressor assembly 10 is mounted to a front wall 48 of the box 32 so that the input and output connectors 24,25 extend therethrough. The housing 19 of the coaxial surge suppressor 10 is provided with a wide grounding strap 50 which is also connected to the male ground pin 36. The resulting installation thus provides protection against surges coming in from the power lines via pins 34—34 and from the coaxial cable system through input connector 12, both surge suppressors 10,40 having their ground returns 50,55 brought to the same point, namely grounding pin 36. An indicator light 52 may optionally be provided to indicate that power is being supplied to the unit.

FIG. 8 is a schematic view showing the connection of various components of a cable television distribution system connected to the outlet box 32 of FIG. 7. The power input pins 34—34 and the grounding pin 36 of a power plug 60 are to be connected to a wall-mounted power outlet socket 62 having power connectors 34'—34', and a grounding connector 36' connected to house power line system ground. Suppression of power line transients by power line suppressor 40 provides surge-protected power to the appliance plug 64 of television reception equipment 66 via power plug terminals 67—67 providing electric power to the television set, and having a grounding pin. 68 returning the television equipment chassis ground (if any) to grounding pin 46 of the accessory outlet receptacle 38. Cable television signals are provided from a remote television source 70 by means of a coaxial line 72 connected to input connector 12 of the coaxial cable suppressor 10. Surge-protected television output signals are supplied from the coaxial cable suppressor output connector 14 through a short length of coaxial line 74 to the video signal input connector 76 of the television equipment 66.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

Thus, the transmission line need not be rectangular as shown, nor need the center conductor (first conducting means) be a planar strip, nor need the structure necessarily be a coaxial one using the housing (second conducting means) as a shell. Although all of these features constitute specific aspects of the invention, other structures performing similar functions may become evident to those of ordinary skill in the art, such as using alternative forms of transmission line structures as a surge suppressor generally preserving their characteristic impedance therealong, and incorporating elements or networks other than a simple capacitor as the series impedance means to provide the requisite low frequency attenuation arising therefrom. The simple inductor shown in the preferred embodiment may be replaced by other elements or networks (first shunt impedance means) providing suitably low impedance in the surge frequency range, and high impedance in the cable television passband to fulfill the demand requirements of the system. Similar considerations also apply to the form of non-linear devices (second shunt impedance means) used for absorption of line surges by means of a breakdown or threshold characteristic of one sort of another.

Also, the claimed subject matter of the instant application is not restricted to the inclusion of input and output terminals in the particular form shown; use of any suitable terminal-forming means at input and output points suitably adapted for connection to electrical devices are to be construed as lying within the broadest aspect of the claimed subject matter of the invention.

Finally, the concept of a capacitor edge-inserted into a transmission line element so that no extraneous lead inductance is introduced to upset the characteristic impedance is broadly applicable not only to a variety of transmission lines incorporating such capacitors for frequency-dependent attenuation, but also may be employed as a convenient way of introducing d.c. isolation into a transmission line element without upsetting the characteristic impedance thereof at the frequency passband of interest. This concept is applicable to a broad spectrum of transmission line configurations.

Also, while the capacitor or equivalent series impedance element and the shunt elements are most desirably inserted across and intermediate portion of the transmission line of the invention, they could also less desirably be placed at an end thereof.

I claim:

1. In a transmission line having first and second axially extending electrically conducting means configured to provide a given characteristic impedance and having a capacitor series-inserted into a gap formed in said first conducting means to provide confronting ends of said first conducting means, the improvement comprising:

said capacitor configured as a plate having first and second electrically conducting terminal-forming portions on first and second major faces thereof respectively and inserted between said confronting ends, said first terminal-forming portion being edge-connected to one of said confronting ends, said second terminal-forming portion being edge-connected to the other of said confronting ends, said plate being disposed transversely with respect to the axis of said first conducting means, so that the principal portion of lead inductance associated with insertion of said capacitor into said transmission line is that of said first conducting means said transmission line being configured as a coaxial structure having said first conducting means as the center conductor of said structure and said second conducting means as a conducting shell disposed therearound, and extending along the interior of said structure will said capacitor insertingly mounted into said strip.

2. In a transmission line having first and second axially extending electrically conducting means configured to provide a given characteristic impedance and having a capacitor series-inserted into a gap formed in said first conducting means to form input and output portions providing confronting ends of said first conducting means, the improvement comprising:

said capacitor configured as a plate having first and second electrically conducting terminal-forming portions on first and second major faces thereof respectively and inserted between said confronting ends, said first terminal-forming portion being edge-connected to one of said confronting ends, said second terminal-forming portion being edge-connected to the other of said confronting ends, said plate being disposed transversely with respect to the axis of said first conducting means, so that the principal portion of lead inductance associated with insertion of said capacitor into said transmission line is that of said first conducting means, said transmission line including input and output connector means for connection to external circuits and adapted for matching to said characteristic impedance, each said connector means including first and second terminals, said first portion of said first conducting means being connected to said first terminal of said input connector means, said second portion of said first conducting means being connected to said first terminal of said output connector means, said second conducting means being connected between said second terminal means of said input and output connector means.

3. The transmission line of claim 2 wherein said first and second connector means are coaxial connectors, said first terminals being the center elements of said connectors, said second terminals being the shells of said connectors.

4. The transmission line of claim 2 including elements for forming a surge suppressor for attenuating surge signals having principal frequency components below a given upper frequency limit and for efficiently passing communication signals occupying a passband having upper and lower communication frequencies, said lower communication frequency being at least one order of magnitude higher than said upper frequency limit said elements including:
   first shunt impedance means connected between said second conducting means and said input portion of said first conducting means, said shunt impedance means having an impedance at said upper frequency limit substantially lower than said characteristic impedance and having an impedance over said passband substantially higher than said characteristic impedance; and
   ground connector means adapted for connecting said second conducting means to earth.

5. The surge suppressor of claim 4 wherein said capacitor has an impedance at said upper frequency limit substantially higher than said characteristic impedance and an impedance over said passband substantially lower than said characteristic impedance.

6. The surge suppressor of claim 2 including second shunt impedance means connected between said second conducting means and said second portion of said first conducting means, said second shunt impedance means having a voltage-dependent impedance presenting a first impedance value at zero applied voltage and a second substantially lower impedance value above a given applied voltage, said first impedance value being substantially higher than said characteristic impedance, said second impedance value being substantially lower than said characteristic impedance.

7. The surge suppressor of claim 6 wherein the impedance presented by said second shunt impedance means over said passband below said given applied voltage is at least an order of magnitude greater than said characteristic impedance.

8. The surge suppressor of claim 7 wherein the capacitance value of said capacitor is chosen to be sufficiently small to restrict the energy delivered to said second shunt impedance means by surge pulses above a given surge voltage value and persisting beyond a given time to energy values within the safe rated value of said second shunt impedance means.

9. The surge suppressor of claim 1 wherein said first shunt impedance means is an inductor.

10. The surge suppressor of claim 4 wherein said transmission line is configured as a coaxial structure having said first conducting means extending between said first input terminal and said first output terminal and said second conducting means are configured as an electrically conducting shell surrounding said first conducting means and connected at its ends to said second input terminal and said second output terminal respectively.

11. The surge suppressor of claim 10 wherein said first and second input terminals are elements of a first coaxial connector having matching properties with said transmission line, said first input terminal being the center element of said first connector, said second input terminal being the shell of said first connector, and said first and second output terminals are elements of a second coaxial connector having matching properties with said transmission line, said first output terminal being the center element of said second connector, said second output terminal being the shell of said second connector.

12. The surge suppressor of claim 5 wherein said transmission line is configured as a coaxial structure having said first conducting means extending between said first input terminal and said first output terminal and said second conducting means configured as an electrically conducting shell surrounding said first conducting means and connected at its ends to said second input terminal and said second output terminal respectively.

13. The surge suppressor of claim 12 wherein said first and second input terminals are elements of a first coaxial connector having matching properties with said transmission line, said first input terminal being the center element of said first connector, said second input terminal being the shell of said first connector, and said first and second output terminals are elements of a second coaxial connector having matching properties with said transmission line, said first output terminal being the center element of said second connector, said second output terminal being the shell of said second connector.

14. The surge suppressor of claim 10 wherein said first shunt impedance means is an inductor.

15. The surge suppressor of claim 12 including second shunt impedance means connected between said second conducting means and said second portion of said first conducting means, said second shunt impedance means having a voltage-dependent impedance presenting a first impedance value at zero applied voltage and a second substantially lower impedance value above a given applied voltage, said first impedance value being substantially higher than said characteristic impedance, said second impedance value being substantially lower than said characteristic impedance.

16. The surge suppressor of claim 15 wherein the impedance presented by said second shunt impedance means over said passband below said given applied voltage is at least three times greater than said characteristic impedance.

17. The surge suppressor of claim 16 wherein the capacitance value of said capacitor is chosen to be sufficiently small to restrict the energy delivered to said second shunt impedance means by surge pulses above a given surge voltage value and persisting beyond a given time to energy values within the safe rated value of said second shunt impedance means.

18. The surge suppressor of claims 4, 5, 13, 14 or 15 wherein said upper frequency limit is approximately 300 kilohertz, said lower passband frequency is approximately 50 megahertz, and said upper passband frequency is approximately 900 megahertz.

19. The surge suppressor of claims 5 or 12 wherein said first and second portions of said first conducting means are configured as axially aligned conducting strips.

20. The surge suppressor of claims 4, 5, 13, 14, or 15 wherein the impedance presented by said first shunt impedance means at said upper frequency limit is substantially less than one-thirtieth of said characteristic impedance, and the impedance presented by said first shunt impedance means at said lower communication frequency is an inductive reactance having a reactance value of about at least three times said characteristic impedance.

21. The surge suppressor of claims 5, 13, 14, or 15 wherein the impedance presented by said series impedance means at said upper frequency limit is at least about three times said characteristic impedance, and at said lower communication frequency is no more than about one-tenth of said characteristic impedance.

22. The surge suppressor of claims 5, 13, 14, or 15 wherein the insertion loss arising from the connection of said surge suppressor between a source and a load having said characteristic impedance is no more than about ¼ dB. over a communication passband having said lower passband frequency at approximately 50 megahertz and said upper passband frequency at approximately 900 megahertz.

23. The surge suppressor of claims 2, 5, 13, 14, or 15 in combination with a power outlet box containing said surge suppressor, said outlet box having power input connector means adapted for connection to a power outlet socket for providing to the interior of said outlet box input electrical power connections and an input grounding connection, said outlet box including a power line transient suppressor for suppressing power line transients powered from said input power connections and grounded to said power input connector means grounding connection, power outlet connector means having power outlet connections and at least one output grounding connection for providing electrical power to an electrical device through said power outlet connections and grounding through said power outlet grounding connection, said transient suppressor providing electrical power to said power outlet connections, said power outlet grounding connection and said ground connector means of said surge suppressor being connected to said input grounding connection.

24. The combination of claim 23 including a coaxial transmission cable for providing television signals in said passband, television reception equipment having a power cord and television signal input connector means, and a power outlet socket providing electrical power and a grounding connection, said transmission cable being connected to said first and second input terminals, said television signal input connector means being connected to said first and second output terminals, said power cord being connected to said power outlet connector means, and said power inlet connect connector means being connected to said power outlet socket.

* * * * *

UNITED STATES PATENT AND TRADEMARK OFFICE
CERTIFICATE OF CORRECTION

PATENT NO. : 5,053,910
DATED : October 1, 1991
INVENTOR(S) : Richard Goldstein

It is certified that error appears in the above-indentified patent and that said Letters Patent is hereby corrected as shown below:

In the Abstract, line 20, replace "capactivie" by --capacitive--.

Column 5, line 11, after "view" insert --of--.

Column 8, line 12, replace "21" by --31--.

In the Claims:

Col. 10, claim 1, line 59, after "and" insert --wherein said center conductor is a conducting strip--.

In Claim 1, line 60, replace "will" by --with--.
Col. 11,
In Claim 6, line 55, replace "2" by --5--.
Col. 12,
In Claim 14, line 54, replace "10" by --12--.

Signed and Sealed this

Twenty-sixth Day of July, 1994

Attest:

BRUCE LEHMAN

*Attesting Officer*     *Commissioner of Patents and Trademarks*